US012162745B2

(12) United States Patent
Whaling

(10) Patent No.: US 12,162,745 B2
(45) **Date of Patent: *Dec. 10, 2024**

(54) PILOT CONTROLLED REFILL TANKS FOR FIREFIGHTING AIRCRAFT

(71) Applicant: Whaling Fire Line Equipment, Inc., Huntington Beach, CA (US)

(72) Inventor: Mark David Whaling, Huntington Beach, CA (US)

(73) Assignee: Whaling Fire Line Equipment, Inc., Huntington Beach, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 17/467,114

(22) Filed: Sep. 3, 2021

(65) Prior Publication Data

US 2022/0055888 A1 Feb. 24, 2022

Related U.S. Application Data

(63) Continuation-in-part of application No. 16/536,219, filed on Aug. 8, 2019, now Pat. No. 11,110,310.

(Continued)

(51) Int. Cl.

*B67D 7/36* (2010.01)
*A62C 3/02* (2006.01)

(Continued)

(52) U.S. Cl.

CPC ............ *B67D 7/362* (2013.01); *A62C 3/0228* (2013.01); *B67D 7/38* (2013.01); *B67D 7/78* (2013.01); *B67D 7/0277* (2013.01)

(58) Field of Classification Search

CPC ... A62C 3/0228; A62C 3/0235; A62C 3/0242; A62C 31/28; A62C 35/68; A62C 35/58;

(Continued)

(56) References Cited

U.S. PATENT DOCUMENTS

| | | |
|---|---|---|
| 3,759,330 A | 9/1973 | Schwartz |
| 5,165,482 A | 11/1992 | Smagac et al. |

(Continued)

FOREIGN PATENT DOCUMENTS

| | | |
|---|---|---|
| AU | 2016101745 | 11/2016 |
| CN | 103253373 | 8/2013 |

(Continued)

OTHER PUBLICATIONS

US, U.S. Appl. No. 16/536,219 (U.S. Pat. No. 11,110,310, filed Aug. 8, 2019, Pilot Controlled Refill Tanks for Firefighting Aircraft.

(Continued)

*Primary Examiner* — Steven J Ganey
(74) *Attorney, Agent, or Firm* — Knobbe, Martens, Olson & Bear, LLP

(57) ABSTRACT

A system for filling a tank for a firefighting helicopter with water without ground personnel, comprising a pilot controlled valve assembly to selectively permit water to flow into the refill tank upon the receipt of a communication transmitted by a communication device within the helicopter. The pilot controlled valve assembly can include a supply valve configured to move between at least a closed state and an open state, a controller configured to control the supply valve, and a receiver configured to send a signal to a controller to cause the controller to at least open the supply valve upon receipt by the receiver of a communication meeting one or more predetermined criteria. The water tank can be filled from a water source, including a municipal water source, when the supply valve is open to provide a more efficient, semi-autonomous refill tank system greatly improves costly and time-consuming manually refill systems.

27 Claims, 11 Drawing Sheets

Related U.S. Application Data

(60) Provisional application No. 62/716,533, filed on Aug. 9, 2018.

(51) Int. Cl.
*B67D 7/38* (2010.01)
*B67D 7/78* (2010.01)
*B67D 7/02* (2010.01)

(58) Field of Classification Search
CPC . B67D 7/362; B67D 7/38; B67D 7/78; B67D 7/0277
USPC .......... 169/5, 13, 34, 46, 47, 53, 52; 239/69, 239/171, 569; 244/136; 141/231
See application file for complete search history.

(56) References Cited

U.S. PATENT DOCUMENTS

| | | | | |
|---|---|---|---|---|
| 5,248,436 | A * | 9/1993 | Kovaletz | B24C 3/06 210/924 |
| 6,209,593 | B1 | 4/2001 | Nichols | |
| 6,889,776 | B2 | 5/2005 | Cheung | |
| 8,226,017 | B2 | 7/2012 | Cohen | |
| 9,333,379 | B2 | 5/2016 | Zimmerman et al. | |
| 9,555,886 | B1 * | 1/2017 | Hawass | A62C 3/0242 |
| 9,829,895 | B2 | 11/2017 | McLoughlin et al. | |
| 10,016,643 | B2 | 7/2018 | Smith et al. | |
| 11,110,310 | B2 | 9/2021 | Whaling | |
| 2002/0125016 | A1 | 9/2002 | Cofield | |
| 2003/0146005 | A1 | 8/2003 | Brooke et al. | |
| 2014/0069666 | A1 | 3/2014 | Vetesnik | |
| 2016/0175633 | A1 | 6/2016 | Smith et al. | |
| 2016/0342161 | A1 | 11/2016 | Allen et al. | |
| 2018/0356221 | A1 | 12/2018 | Kusumoto et al. | |
| 2019/0009117 | A1 | 1/2019 | Sprod | |

FOREIGN PATENT DOCUMENTS

| | | |
|---|---|---|
| DK | 2014 70537 | 3/2016 |
| WO | WO 2016/016880 | 2/2016 |
| WO | WO 2017/090040 | 6/2017 |
| WO | WO 2017/208272 | 12/2017 |

OTHER PUBLICATIONS

Superior Tank Company Inc. https://superiortank.com/ A Hydrant For Helicopters, Webpage in 4 Pages Dated 2019.
Cannon Water Technology, Webpage in 4 Pages Dated 2019.
Fastank http://fastank.com/index.php/fastank-firefighter in 4 pages, dated Aug. 21, 2018.
HeliHub http://helihub.com/2018/06/18/new-hydrant-for-firefighting-helicopters-may-cut-response-time/.

* cited by examiner

PILOT CONTROLLED REFILL TANKS FOR FIREFIGHTING AIRCRAFT

INCORPORATION BY REFERENCE TO ANY PRIORITY APPLICATIONS

This application is a continuation-in-part of U.S. patent application Ser. No. 16/536,219 (filed Aug. 8, 2019), which claims the priority benefit under 35 U.S.C. § 119(e) to U.S. Provisional Patent Application Ser. No. 62/716,533 (filed Aug. 9, 2018), the entirety of which is hereby expressly incorporated by reference as if fully set forth herein.

BACKGROUND

Field of the Disclosure

The disclosure relates to refill tanks, in particular, to refill tanks used for refilling firefighting helicopters.

Description of the Related Art

Conventional refill tank systems used in firefighting operations require ground personnel to be present on the ground at the tank to manually turn on and off a water supply valve to fill the water tank for helicopter snorkel-based refilling operations. This can result in significant and critical delays in initial firefighting operations, particularly for tanks in hard to reach areas or that are far from fire stations and/or firefighting personnel, can result in efficiency losses in helicopter usage (including fuel and pilot time). Additionally, maintaining firefighting personnel on location at each refill tank can reduce the number of firefighters available for firefighting efforts, can increase firefighting personnel costs, can result in additional delays in refill times for firefighting helicopters. Additionally, because current refill tank systems require the use of ground personnel to operate such systems, tank systems are not always located in the most strategic locations for firefighting operations.

SUMMARY OF SOME EMBODIMENTS

The systems, methods and devices described herein have innovative aspects, no single one of which is indispensable or solely responsible for their desirable attributes. Without limiting the scope of the claims, some of the advantageous features will now be summarized.

To provide a solution to the drawbacks and limitations of conventional refill tank systems used in firefighting operations, embodiments disclosed herein comprise a system for filling a firefighting helicopter with water without ground personnel, comprising a water refill tank having an opening in an upper portion thereof, an inlet pipe, and an interior space in fluid communication with the inlet pipe, wherein the inlet pipe is configured to be coupleable with a water source, a pilot controlled valve assembly in fluid communication with the inlet pipe and configured to selectively control a flow of water from the water source into the interior space of the water refill tank, the pilot controlled valve assembly comprising a supply valve (also referred to herein as a first valve or a fill valve) configured to move between at least a closed state and an open state, a controller electronically coupled with the supply valve, a receiver electronically coupled with the controller, and a power supply configured to provide a supply of power to at least one of the supply valve, the controller, and the receiver.

Any embodiments of the system for filling a firefighting helicopter with water without ground personnel can have one or more of the following components, features, or details, in any combination: (a) wherein the water tank is configured to receive an end portion of a water refill hose into the interior space of the water refill tank from a firefighting helicopter hovering above or near the water refill tank so that the firefighting helicopter can withdraw water from the water refill tank to use for extinguishing fires; (b) wherein the receiver is configured to receive a communication produced by a transmitter within a firefighting helicopter and to provide an output communication to the controller; (c) wherein the controller is configured to cause the supply valve to at least move from the closed state to the open state substantially automatically upon receipt of the output communication from the receiver, thereby permitting a flow of water from the water source into the interior space of the water refill tank without the need for a ground support personnel; (d) wherein the opening in the upper portion of the water refill tank is configured such that a helicopter hovering above the water refill tank can siphon water from the water refill tank through a refill hose coupled with the helicopter and having an end portion that has been dropped through the opening in the top of the water refill tank; (e) wherein the water source comprises a water pipe coupled with a municipal water source; (f) wherein the receiver is configured to provide the output communication to the controller upon receipt of from one to six clicks from the transmitter during a five second period of time; (g) wherein the receiver is configured to provide the output communication to the controller upon receipt of from one to six clicks from the transmitter over a predetermined radio frequency during a five second period of time; (h) wherein the receiver is configured to receive a communication over a preset radio frequency from the transmitter and to provide the output communication to the controller upon receipt of a predetermined radio communication; (i) wherein the receiver is configured to receive a communication over a preset VHF radio frequency from a transmitter and to provide the output communication to the controller upon receipt of a predetermined radio communication; (j) wherein the output communication comprises at least one of a voltage, a current, a pulse, and an electromagnetic wave; (k) wherein the receiver is configured to provide the output communication to the controller if the communication comprises one or more predetermined characteristics transmitted over a predetermined radio frequency or range of predetermined frequencies during a predetermined period of time not exceeding a predetermined period of time; (l) wherein the predetermined period of time is from four to seven seconds; (m) wherein the receiver is configured to provide the output communication to the controller upon receipt of at least a predetermined number of clicks from the transmitter over a predetermined radio frequency during a predetermined period of time; (n) wherein the predetermined number of clicks is from one to eight clicks; (o) wherein the predetermined number of clicks is from three to five clicks; (p) wherein the predetermined number of clicks is three clicks; (q) wherein the predetermined number of clicks is four clicks; (r) wherein the predetermined radio frequency is from 118.000 MHz to 132.000 MHz; (s) wherein the predetermined radio frequency is from 122.700 MHz to 123.075 MHz; (t) wherein the predetermined radio frequency is from 122.000 MHz to 125.000 MHz; (u) wherein the predetermined radio frequency is 122.800 MHz; (v) wherein the predetermined radio frequency is the same as the universal communications frequency; (w) wherein the receiver is tunable to any frequency from 118.000 MHz to 132.000 MHz; (x) wherein the receiver is tunable by adjusting one or more switch settings; (y) wherein the predetermined period begins upon receipt of a first click received by the receiver; (z) wherein the predetermined period of time is from one to ten seconds; (aa) wherein the predetermined period of time is from three to five seconds; (ab) wherein the predetermined period of time is five seconds; (ac) wherein the receiver is configured to receive a communication produced by a transmitter within the firefighting helicopter and to provide an output communication to the controller when the firefighting helicopter is within a predetermined distance from the receiver; (ad) wherein the predetermined distance is approximately one mile; (ae) wherein the predetermined distance is approximately one-half mile; (af) wherein the predetermined distance is from approximately one-quarter mile to approximately three miles; (ag) wherein the predetermined distance is from approximately one-half mile to approximately one mile; (ah) wherein the predetermined distance is no more than approximately one mile; (ai) wherein the pilot controlled valve assembly comprises an antennae in electronic communication with the receiver; (aj) wherein the pilot controlled valve assembly comprises an antennae having a detection range of from approximately one-half mile to approximately one mile; (ak) wherein the pilot controlled valve assembly further comprises a relay assembly; (al) wherein the supply valve comprises a solenoid valve; (am) wherein the pilot controlled valve assembly is configured to remain powered on and in a ready state at all times and to receive a communication produced by a transmitter within a firefighting helicopter at any time of the day; (an) wherein the power supply is a 24-volt direct current power supply (which can include a battery); (ao) wherein the power supply is a 110 volt power supply; (ap) wherein the power supply comprises at least one of a photovoltaic panel and a battery; (aq) wherein the transmitter comprises a button within the helicopter that is configured to be actuated by a pilot of the helicopter; (ar) wherein the transmitter comprises a pre-existing button within the helicopter that is configured to be actuated by a pilot of the helicopter; (as) wherein the transmitter comprises a radio transmission switch or button within the helicopter that is configured to be actuated by a pilot of the helicopter; (at) wherein the transmitter comprises a radio transmission button on a collective lever within the helicopter; (au) wherein the system is configured to close the supply valve when a level of water within the interior space of the water refill tank reaches a predetermined level; (av) further comprising a water level sensor in communication with the water within the interior space of the water refill tank and configured to cause the supply valve to close when a level of water within the interior space of the water refill tank reaches a predetermined level; (aw) comprising a water level sensor positioned within a stilling well or housing in fluid communication with the water within the water refill tank, the water level sensor being is configured to cause the supply valve to close when a level of water within the interior space of the water refill tank reaches a predetermined level; (ax) including a drain assembly configured to automatically close when a flow rate through the drain assembly reaches a threshold level and to remain open when a flow rate through the drain assembly is below the threshold level; (ay) wherein the drain assembly includes a valve assembly including a stopper that is configured to move from a first open position to a second closed position when a flow rate through the drain assembly reaches the threshold level; and/or (az) wherein the valve assembly includes a stopper configured to move from a first position spaced apart from a seal to a second position in contact with the seal when a flow rate through the drain assembly reaches the threshold level.

Some embodiments comprise a remotely controlled valve assembly for a firefighting substance refill tank, having a supply valve configured to move between at least a closed state and an open state, a controller electronically coupled with the supply valve, and a receiver electronically coupled with the controller.

Any embodiments of the remotely controlled valve assembly for the firefighting substance refill tank can have one or more of the following components, features, or details, in any combination: (a) wherein the remotely controlled valve assembly comprises a pilot controlled valve assembly; (b) a power supply configured to provide a supply of power to at least one of the supply valve, the controller, and the receiver; (c) wherein the receiver is configured to receive a communication produced by a transmitter within the firefighting helicopter and to provide an output communication to the controller when the firefighting helicopter is within a predetermined distance from the receiver that is no greater than 5 miles; (d) when the receiver receives from one to six clicks from the transmitter during a predetermined period of time not exceeding ten seconds; (e) wherein the controller can be configured to cause the supply valve to move from the closed state to at least the open state substantially automatically upon receipt of the output communication from the receiver, thereby permitting a flow of water from the water source into the water refill tank without the need for a ground support personnel; and (f) wherein the substance can be water, a fire suppression liquid or solid, or other liquid or solid substance, or any combination of the foregoing.

Some embodiments comprise a method of remotely controlling a supply valve of a refill tank for a firefighting helicopter, comprising receiving a communication transmitted from one or more components within a firefighting helicopter, opening a supply valve in communication with the refill tank to permit a flow of a substance into the refill tank, at least partially filling the refill tank with the substance, and closing the supply valve to stop the flow of the substance into the refill tank.

Any embodiments of the method of remotely controlling a supply valve of a refill tank for a firefighting helicopter can include one or more of the following steps, procedures, components, or features, in any combination: (a) receiving a communication having one or more clicks transmitted from the firefighting helicopter; (b) counting a number of clicks in the communication transmitted from the firefighting helicopter for a predetermined period of time and opening the supply valve if the number of clicks in the predetermine period of time is equal to or greater than a predetermined number of clicks; (c) counting a number of clicks in the communication transmitted from the firefighting helicopter within a predetermined period of time not exceeding five seconds and opening the supply valve if the number of clicks in the predetermine period of time is equal to five; (d) receiving a communication having one or more clicks transmitted from the firefighting helicopter only if the firefighting helicopter is within a predetermined distance from the refill tank; (e) receiving a communication having one or more clicks transmitted from the firefighting helicopter only if the firefighting helicopter is at or within an approximately one mile radius from the refill tank; (f) receiving a communication having one or more clicks transmitted from the firefighting helicopter only if the firefighting helicopter is at or within an approximately one-half mile radius from the refill tank; (g) receiving a communication transmitted from one or more components within a firefighting helicopter if the communication is transmitted at a predetermined frequency; (h) wherein closing the supply valve to stop the flow of the substance into the refill tank includes closing the supply valve to stop the flow of the substance into the refill tank when a level of the substance within the refill tank reaches a predetermined level; and (i) wherein closing the supply valve to stop the flow of the substance into the refill tank includes closing the supply valve to stop the flow of the substance into the refill tank upon receipt of a communication having a second set of criteria.

Some embodiments of the system for filling a firefighting vehicle with water can include at least one water refill tank having an inlet pipe, at least one wall, an interior space enclosed by the at least one wall and in fluid communication with the inlet pipe, wherein the water tank is configured to receive an end portion of a water refill hose from the firefighting vehicle so that the firefighting vehicle can withdraw water from the water refill tank to use for extinguishing fires, a remote controlled valve assembly in fluid communication with the inlet pipe and configured to selectively control a flow of water through the inlet pipe, the remote controlled valve assembly that can include a supply valve configured to move between at least a closed state and an open state, a controller electronically coupled with the supply valve, a receiver electronically coupled with the controller, and a power supply configured to provide a supply of power to at least one of the supply valve, the controller, and the receiver. In some embodiments, the receiver can be configured to receive a communication produced by a transmitter within the firefighting vehicle and to provide an output communication to the controller and the controller can be configured to cause the supply valve to at least move from the closed state to the open state substantially automatically upon receipt of the output communication from the receiver, thereby permitting a flow of water from the water source into the interior space of the water refill tank without the need for a ground support personnel.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Embodiments of the present disclosure will now be described hereinafter, by way of example only, with reference to the accompanying drawings in which:

DETAILED DESCRIPTION

Figure 1:
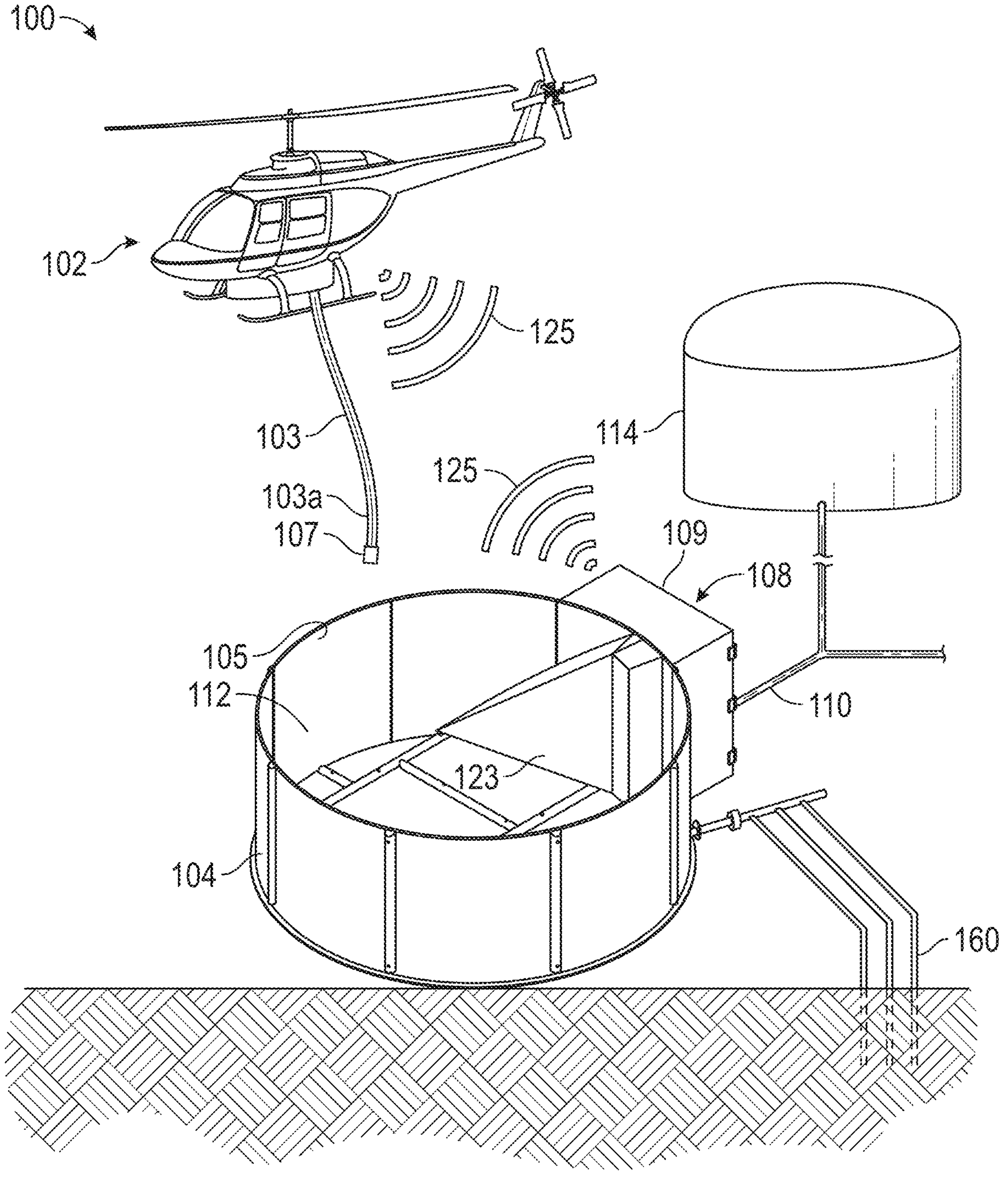
FIG. 1 is an illustration of a system for filling a firefighting helicopter with water without ground personnel.
Figure 2:
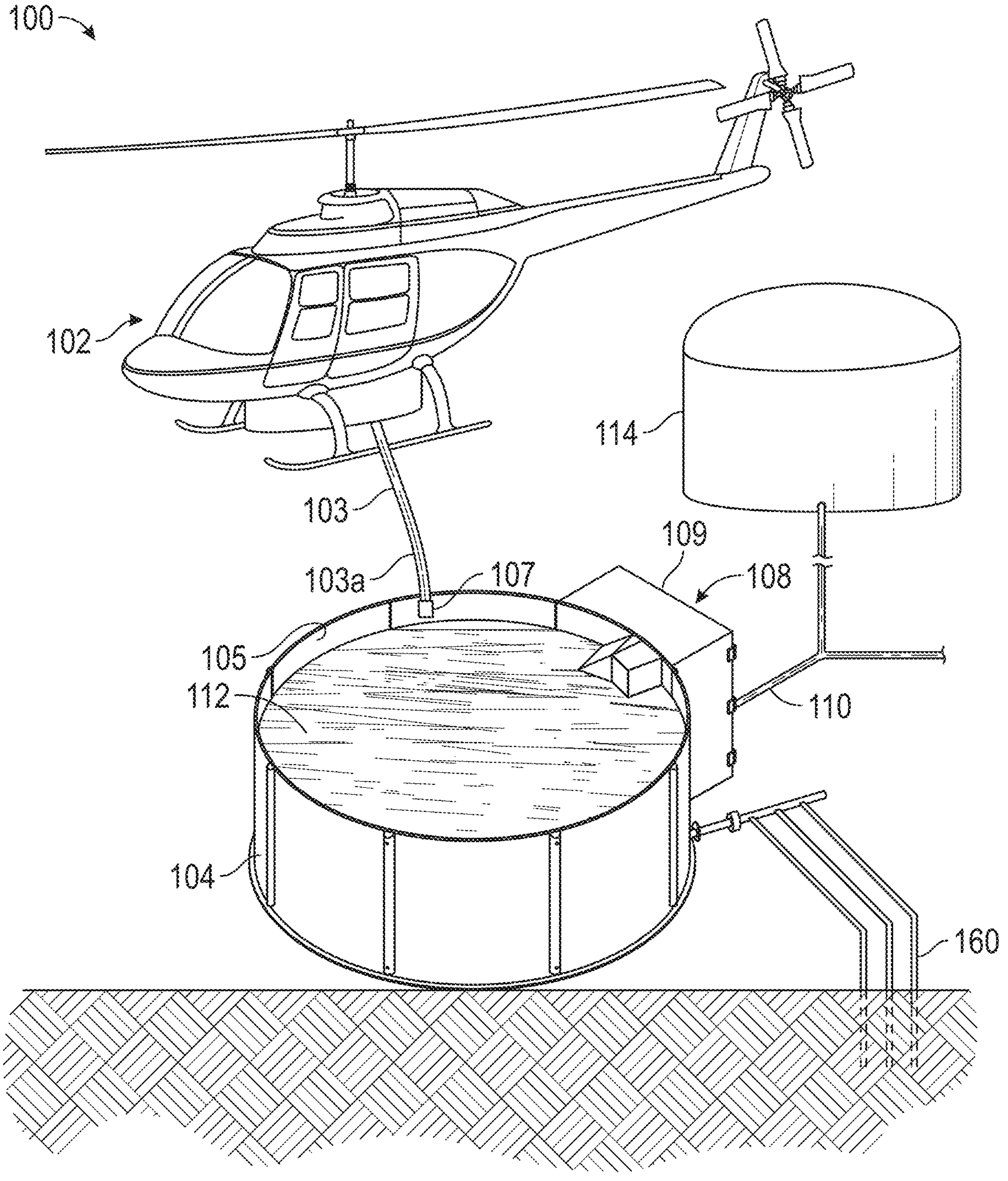
FIG. 2 is another illustration of the system shown in FIG. 1 for filling a firefighting helicopter with water without ground personnel.
Figure 3:
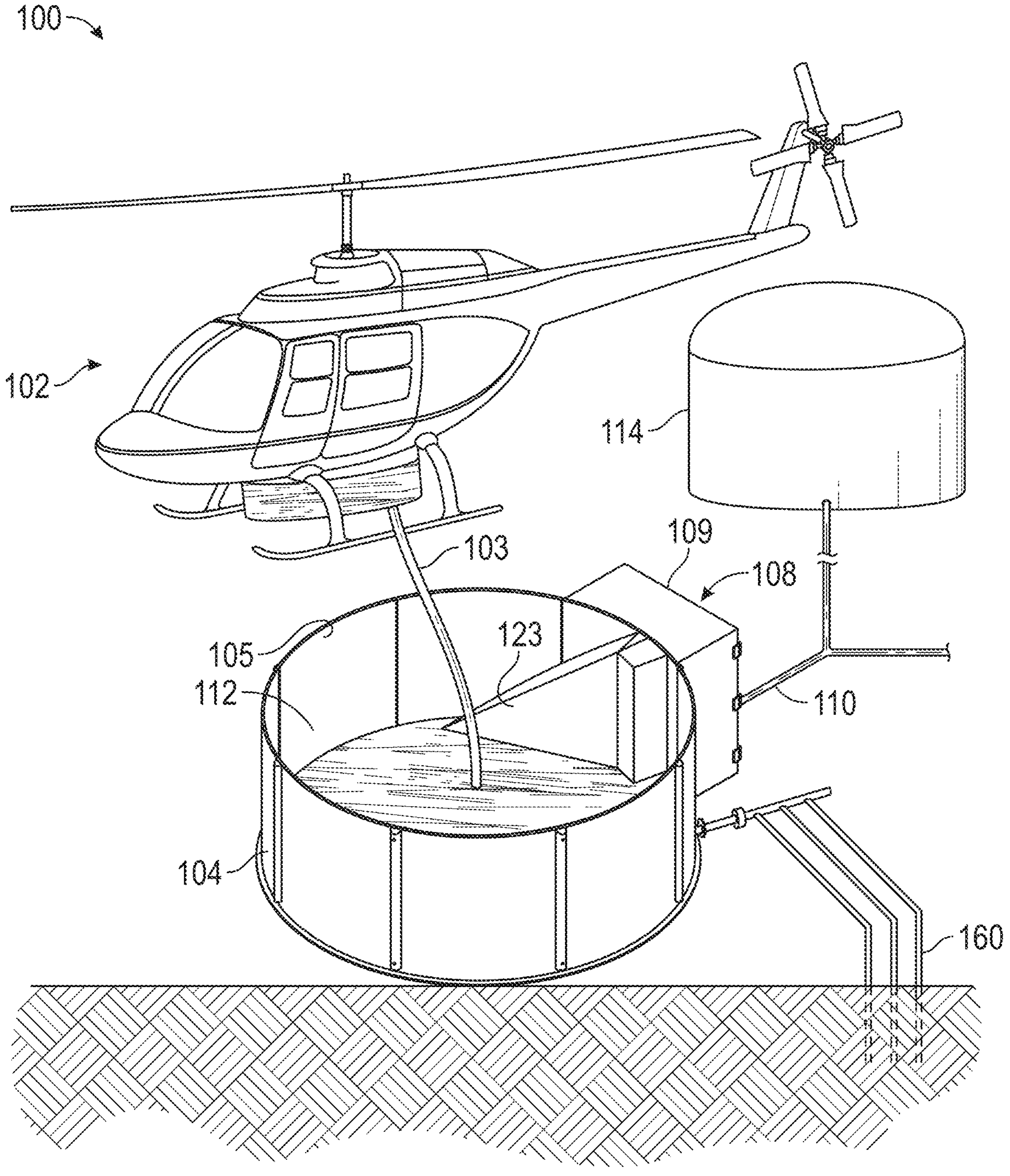
FIG. 3 is another illustration of the system shown in FIG. 1 for filling a firefighting helicopter with water without ground personnel.
Figure 4:
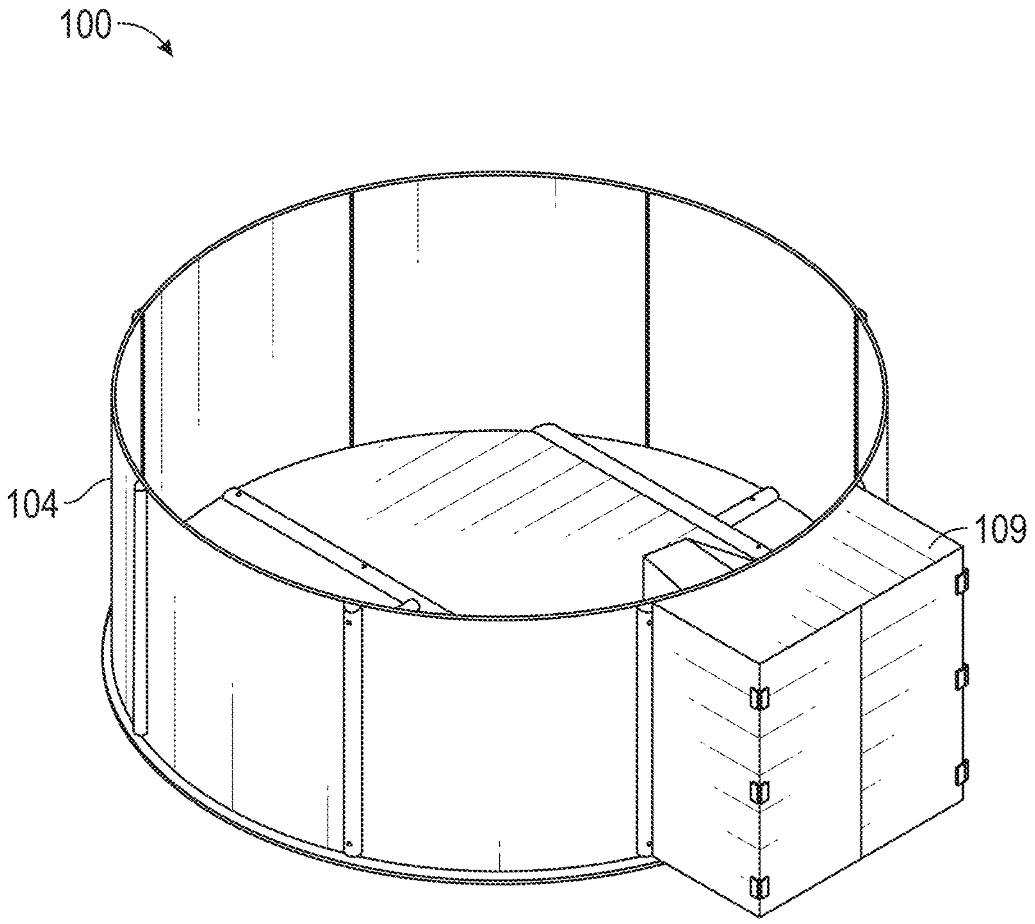
FIG. 4 is another illustration of the system shown in FIG. 1 for filling a firefighting helicopter with water without ground personnel.

Embodiments of systems, components and methods of assembly and manufacture will now be described with reference to the accompanying figures, wherein like numerals refer to like or similar elements throughout. Although multiple embodiments (also referred to herein as embodiments, such that the term embodiment is meant to be interpreted to be synonymous), examples, and illustrations are disclosed herein, the inventions described herein extend beyond the specifically disclosed embodiments, examples, and illustrations disclosed herein and can include other uses of the inventions and obvious modifications and equivalents thereof, and combinations of any of the embodiments or the components, features, and/or details of any of the embodiments disclosed herein. Additionally, it should be noted that the descriptions of all of the embodiments disclosed herein should be interpreted to include any of the features, components, and other details of any of the other embodiments disclosed here in combination with or in the alternative to any of the features, components, and other details explicitly described herein. Therefore, any embodiments of the water refill tank systems or components thereof disclosed herein can have any of the features, components, and/or other details of any of the other embodiments of the water refill tank systems or components thereof disclosed herein, including the embodiments and components thereof recited in the claims, to form additional embodiments having any combination of any of the features disclosed herein.

Embodiments of the tank based refill systems disclosed herein provide an innovative fire protection solution aimed at maximizing the water dropping capabilities of helicopters and/or other manned or unmanned aircraft including but not limited to drones, to protect both wildlife and communities from wildfires. The tank based refill systems disclosed herein can be strategically placed across cities, rural areas, wildland interface communities, or in any desired locations. The tank based refill systems disclosed herein can enable a significantly faster initial aerial response times and turnaround times to fires from refill tanks, allowing for more water drops per hour, and can free up ground firefighting resources. Systems disclosed herein can also make it easier for helicopters to refill in areas that may not be safely or feasibly accessible to ground based vehicles, either due to terrain conditions, distance, or fire hazard conditions. Additionally, systems disclosed herein can also make it easier for helicopters or pilots outfitted with night vision equipment to refill the helicopter during nighttime or dark hours.

An advantage of the new and innovative systems disclosed herein is that such systems do not require ground support crews, leaving more firefighters available for the crucial initial fire attack. Additionally, any embodiments of the systems and valve assemblies disclosed herein can merge seamlessly with already existing municipal water systems. Additionally, the systems disclosed herein enable a more efficient use of helicopters because the helicopters do not need to hover or wait by or near the tank for ground personnel to travel to the tank and manually open the tank supply valve, as is required in conventional systems. This can reduce the cost of firefighting air operations, can reduce helicopter fleet maintenance due to less rotor time, and can help fire departments suppress a fire sooner and keep fires smaller, and can, accordingly, improve safety for communities and for wildlife.

FIG. 1 illustrates a system 100 for filling a firefighting helicopter 102 with water without ground personnel, having a water refill tank 104 and a pilot controlled valve assembly 108. In any embodiments, some or all of the components of the pilot controlled valve assembly 108 can optionally be located within an enclosure 109. The water refill tank 104 can have an opening 105 in an upper portion thereof that can be configured to receive a refill hose or snorkel 103 (also referred to herein as a water refill hose) of firefighting helicopter 102, an inlet pipe 110, a drain pipe 111, and an interior space 112 in fluid communication with the inlet pipe 110 and the drain pipe 111. The inlet pipe 110 can be positioned over a supply opening in a wall of the tank 104 so that water can selectively flow from the inlet pipe 110, through the supply opening, and into the interior space 112 of the tank 104. The drain pipe 111 can be positioned over an drainage opening in a wall of the tank 104 so that water can selectively flow from the interior space 112 of the tank 104 through the drainage opening, and out through the drain pipe 111 to a desired drainage location. A filter or screen can be positioned over any one of the openings described herein.

To prevent the tank 104 from overflowing, some embodiments of the tank 104 can have an overflow pipe 113 in fluid communication with the interior space 112 of the tank 104. The overflow pipe 113 can have an end portion positioned over an overflow opening in a wall of the tank 104 so that water can flow from the interior space 112 of the tank 104 through the overflow opening, and out through the overflow pipe 113 to a desired drainage location when the water level within the interior space 112 of the tank 104 reaches a predetermined level (i.e., the level of the overflow opening). In any embodiments, the overflow opening can be positioned lower than the supply opening in the tank 104, for example, approximately 12 inches lower, or from approximately 6 inches lower to approximately 18 inches lower, than the supply opening, depending on the size of the pipes and/or any applicable municipal water requirements.

The inlet pipe 110 can be configured to be coupled with or in communication with a water source 114 that can include a lake, reservoir, storage tank, one or more water pipes or other body or source of water. The water source can be a municipal water source. The water source can have a pressure sufficient to fill the tank 104 when the pilot controlled valve assembly 108 is in an open position or state. The water tank 104 can be configured to receive an end portion 103*a* of a water refill hose 103 into the interior space 112 of the water refill tank 104 from a firefighting helicopter 102 hovering above or near the water refill tank 104 so that the firefighting helicopter 102 can withdraw water (also commonly referred to as snorkeling water) from the water refill tank 104 to use for extinguishing fires. A pump 107 can be coupled with an end portion 103*a* of the refill hose 103 to pump water through the hose 103 to a holding tank in the helicopter or other aircraft. The inlet pipe 110 and the overflow pipe 113 can have a six inch or approximately six inch diameter, or from approximately two to approximately six inches, or have any desired size. The drain pipe 111 can have a two inch or approximately two inch diameter, or from approximately one inch to approximately six inches, or have any desired size.

In any embodiments, the tank 104 can be used for refilling any desired water tank or water holding device tethered to or supported by the helicopter or other aircraft, which includes but is not limited to a water bucket or dipping bucket tethered to the aircraft. Additionally, any embodiments disclosed herein can be used for refilling other manned or unmanned (i.e., autonomous) aircraft and are not limited to refilling a helicopter. Therefore, in any embodiments, such systems should be understood to be adaptable for use with any suitable aircraft and not be limited to use with helicopters.

In any embodiments, the opening 105 in the upper portion of the water refill tank 104 can be configured such that a helicopter hovering above the water refill tank 104 can siphon water from the water refill tank 104 through a refill hose (also referred to herein as a snorkel) 103 coupled with the helicopter and having an end portion 103*a* that has been dropped or passed through the opening 105 in the top of the water refill tank 104. In any embodiments, the system can have a plurality of water refill tanks 104 positioned in different, spaced apart locations, wherein each of the plurality of water refill tanks 104 can include any of the embodiments of the pilot controlled valve assembly 108 disclosed herein.

The pilot controlled valve assembly 108 can be in fluid communication with the inlet pipe 110 and be configured to selectively control a flow of water from the water source 114 into the interior space 112 of the water refill tank 104. The pilot controlled valve assembly 108 can be configured to selectively control a flow of water from the water source 114 into the interior space 112 of the water refill tank 104 without needing any ground support personnel, and/or without any manual input or activation at the location of the pilot controlled valve assembly 108.

Any embodiments of the pilot controlled valve assembly 108 can have a selectively controllable supply valve 120 (that can, optionally, comprise a solenoid valve) configured to move between at least a closed state (in which no water is able to pass through the supply valve 120) and an open state (in which water is able to pass through the supply valve 120), a controller 122 electronically coupled with the supply valve 120, and a receiver 124 electronically coupled with the controller 122. The supply valve 120 can be coupled with the inlet pipe 110. Any embodiments of the pilot controlled valve assembly 108 can also have a selectively controllable drain valve 121 (that can, optionally, comprise a solenoid valve) configured to move between at least a closed state (in which no water is able to pass through the drain valve 121) and an open state (in which water is able to pass through the drain valve 121). The drain valve 121 can be coupled with the drain pipe 111. In some embodiments, the drain valve 121 can remain in an open state when the tank 104 is in a standby or non-operational mode so that water that has filled the tank 104, rain water, or other water (from condensation or otherwise) can be drained from the tank 104 when the tank 104 is in the standby or non-operational mode.

Figure 5:
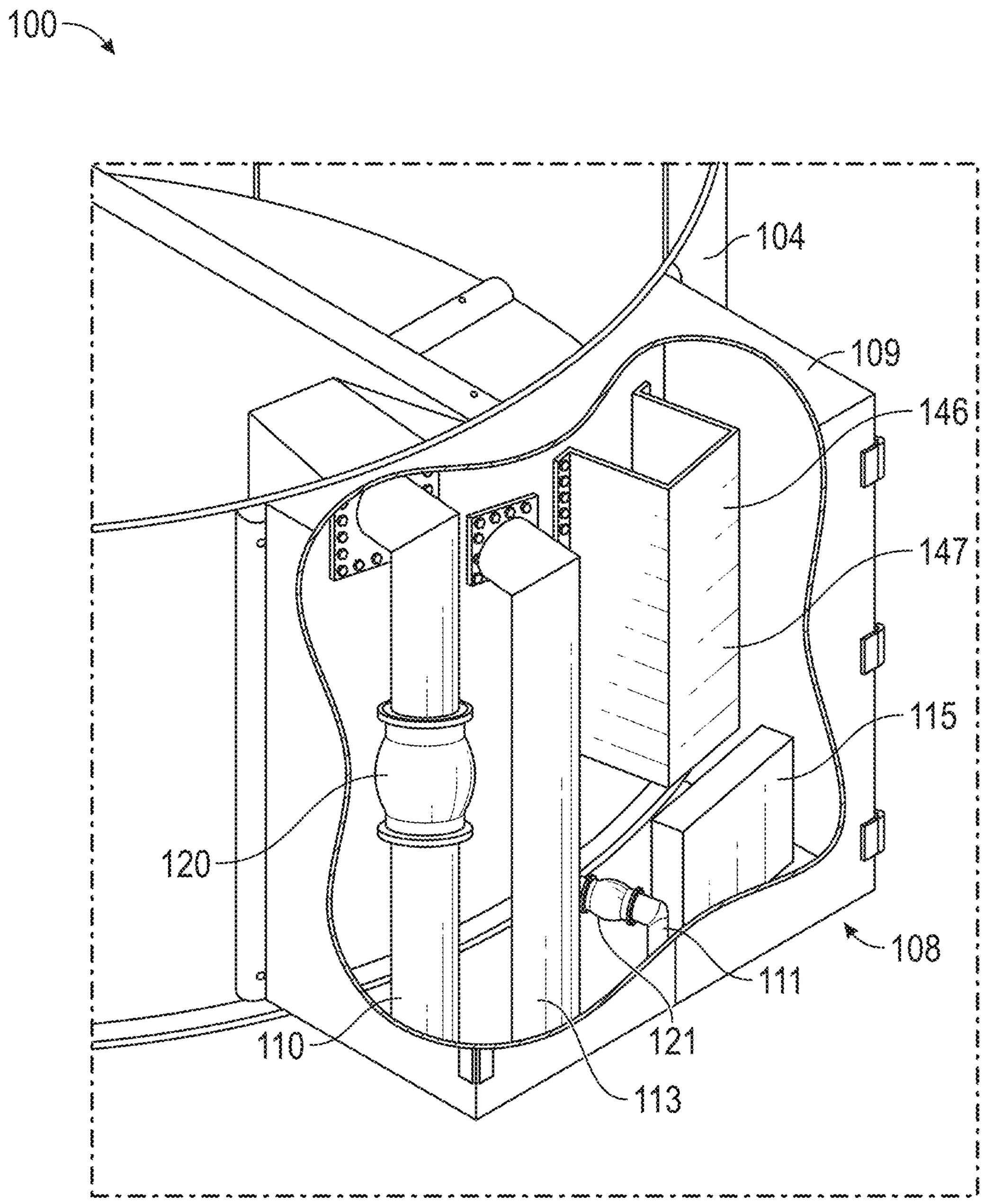
FIG. 5 is an illustration of a portion of the system shown in FIG. 1 for filling a firefighting helicopter with water without ground personnel.
Figure 6:
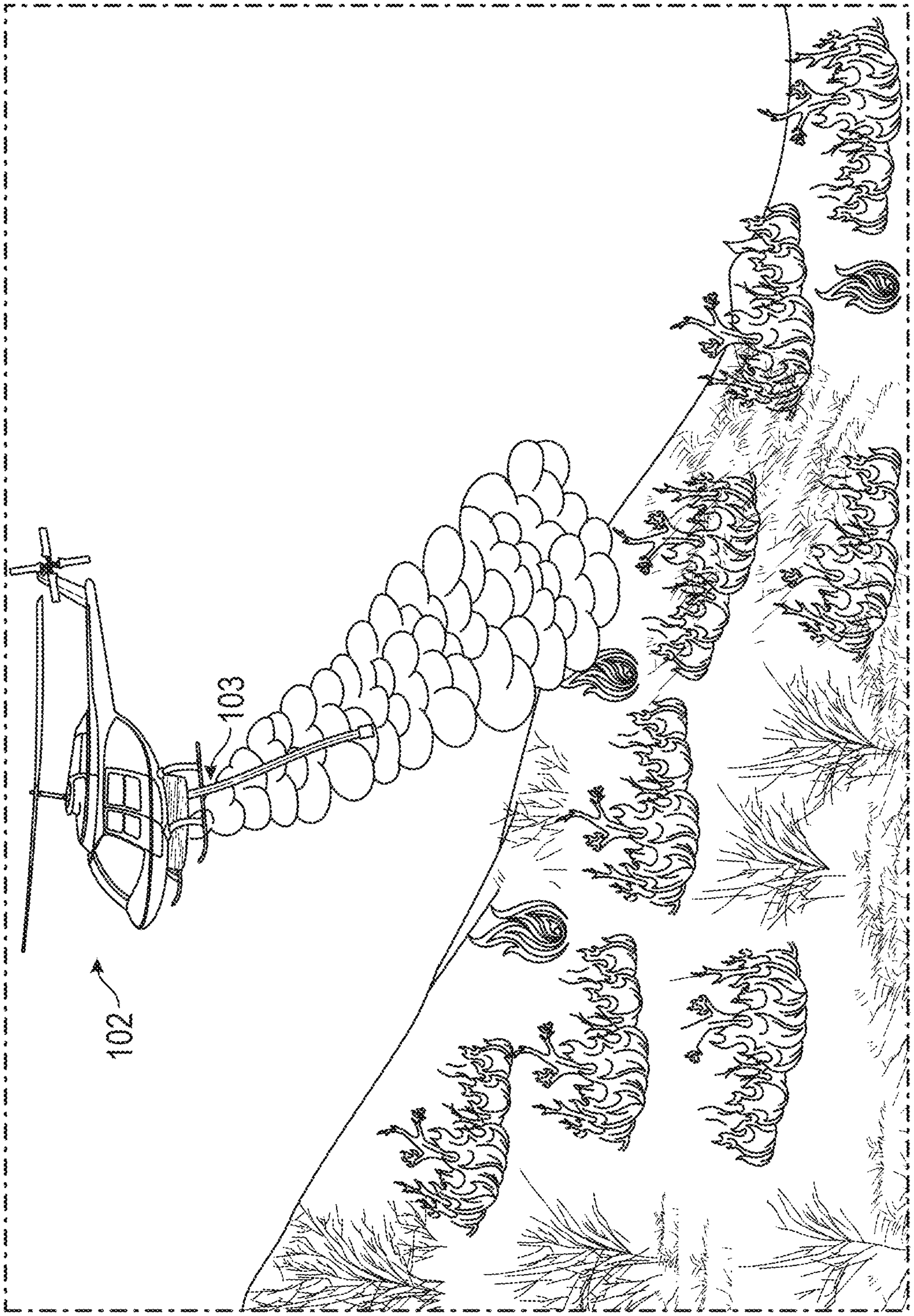
FIG. 6 is an illustration of the firefighting helicopter dropping water on a fire.

Further, any embodiments of the pilot controlled valve assembly 108 can have a power supply 130 configured to provide a supply of power to at least one of the supply valve 120, the controller 122, and the receiver 124. In some embodiments, the receiver 124 can be configured to receive a communication 125 produced by a transmitter within a firefighting helicopter 102 and to provide an output communication to the controller 122. The controller 122 can be configured to cause the supply valve 120 to at least move from the closed state to the open state (e.g., substantially automatically) upon receipt of the output communication from the receiver 124, thereby permitting a flow of water from the water source 114 into the interior space 112 of the water refill tank 104 without the need for a ground support personnel. Additionally, the controller 122 can be configured to cause the drain valve 121 to at least move from the open state to the closed state (e.g., substantially automatically) upon receipt of the output communication from the receiver 124, thereby terminating any flow of water from the interior space 112 of the water tank 104 through drain pipe 111. In any embodiments, one or more of the components of the pilot controlled valve assembly 108, such as for example and without limitation, the controller 122 and the receiver 124, can be positioned within an enclosure 115, as shown in FIG. 5.

As mentioned, some embodiments of the tank 104 and pilot controlled valve assembly 108 can remain in a standby or non-operational state (also referred to herein as a first mode or first state) until triggered or activated by a transmission from a pilot of an aircraft or otherwise remotely activated. In the standby state, the drain valve 121 would in some embodiments be in an open position to allow drainage of the tank 104, and the supply valve 120 would be in a closed position to prevent water from the inlet pipe 110 from flowing into the tank 104. Upon an activation by a predetermined signal or transmission from a pilot of an aircraft or other predesignated remote source, the pilot controlled valve assembly 108 can (substantially automatically) close the drain valve 121 and (substantially automatically) open the supply valve 120, simultaneously or generally simultaneously to fill the tank 104, thereby changing the tank 104 and pilot controlled valve assembly 108 from the first state to a second, active state.

In any embodiments, the system can be configured to (e.g., substantially automatically) close the supply valve 120 when a level of water within the interior space 112 of the water refill tank 104 reaches a predetermined level, a maximum level, or maximum desired level. For example, the system 100 can have a water level sensor 146 (also known as and/or referred to as a float valve, an altitude valve or a level control valve) in fluid communication with the interior space 112 of the water refill tank 104 and configured to cause the supply valve 120 to close when a level of water within the interior space 112 of the tank reaches the predetermined or maximum desired level. For example and without limitation, the system 100 can have a water level sensor 146 positioned inside a stilling well or other housing 147 in fluid communication with the interior space 112 of the water refill tank 104, the water level sensor 146 being can be configured to cause the supply valve 120 to close when a level of water within the interior space 112 of the tank reaches a predetermined level or maximum desired level. In some embodiments, the housing 147 can be approximately 12 inches wide, approximately 12 inches in depth, and approximately 24 to approximately 36 inches tall. One or more openings (that can optionally be covered by or comprise a screen or filter) can cause water within the interior space 112 of the tank 104 to flow into and/or out of the stilling well 147, as the water level within the interior space 112 of the tank 104 rises and falls so that the sensor 146 is able to accurately sense the level of the water within the tank 104.

When the system 100 is in the active state, the position (i.e., whether open or closed) of the supply valve 120 can optionally be controlled by the water level sensor 146 such that water will flow through the inlet pipe 110 and fill the tank 104 up to the desired maximum water level determined at least by the position of the water level sensor 146 continually and cyclically until the system is changed to the standby state (such as through a second transmission from the pilot or other remote source). In the active state, therefore, the tank will continually refill with water up to the desired maximum water level until changed to the standby state. This will substantially reduce wait times and hover times for the aircraft (or multiple aircrafts) since the tank can begin refilling when the level drops below the maximum desired water level. In most cases, in this configuration, when the aircraft returns for another refill, the tank will have already been filled.

Changing the system 100 from the active state to the standby state can be achieved by sending a second signal or transmission to the pilot controlled valve assembly 108. This will close (e.g., substantially automatically) the supply valve 120 and open (e.g., substantially automatically) the drain valve 121, thereby draining the tank 104. In some embodiments, the system 100 can have an indicator light or other indicator positioned in a visible location to confirm to the pilot that the system 100 has received the transmission from the pilot or other remote source and has changed to the standby state. For example and without limitation, the indicator can include a red light positioned on the tank. The indicator or indicator light can be configured to remain activated for a predetermined period of time, such as five minutes, or thirty minutes, or any desired length of time.

Any embodiments of the systems disclosed herein can be configured such that the tanks stand by dry or substantially empty until needed, which is safer for wildlife and humans. When filled, snorkeling helicopters can draw water from tank. In any embodiments disclosed herein, a pit, a concrete or steel basin, a portable reservoir or tank, a mobile reservoir or tank, a well, or other reservoir can be used in place of the tank or tanks that are described.

Any embodiments of the tank 104 can have one or more components or features configured to permit a person or animal that has fallen into the tank 104 or is otherwise inside the tank 104 a way to get out of the tank 104. This can reduce and/or eliminate inadvertent deaths of persons or animals that may otherwise be unable to get out of the tank. For example and without limitation, the tank 104 can optionally have a ramp 123 positioned in an interior space 112 of the tank 104, which can be adjacent to a side wall portion of the tank 104, configured to permit a person or an animal to walk, crawl, or otherwise ascend the ramp 123 to be able to exit the interior space 112 of the tank 104.

Figure 7:
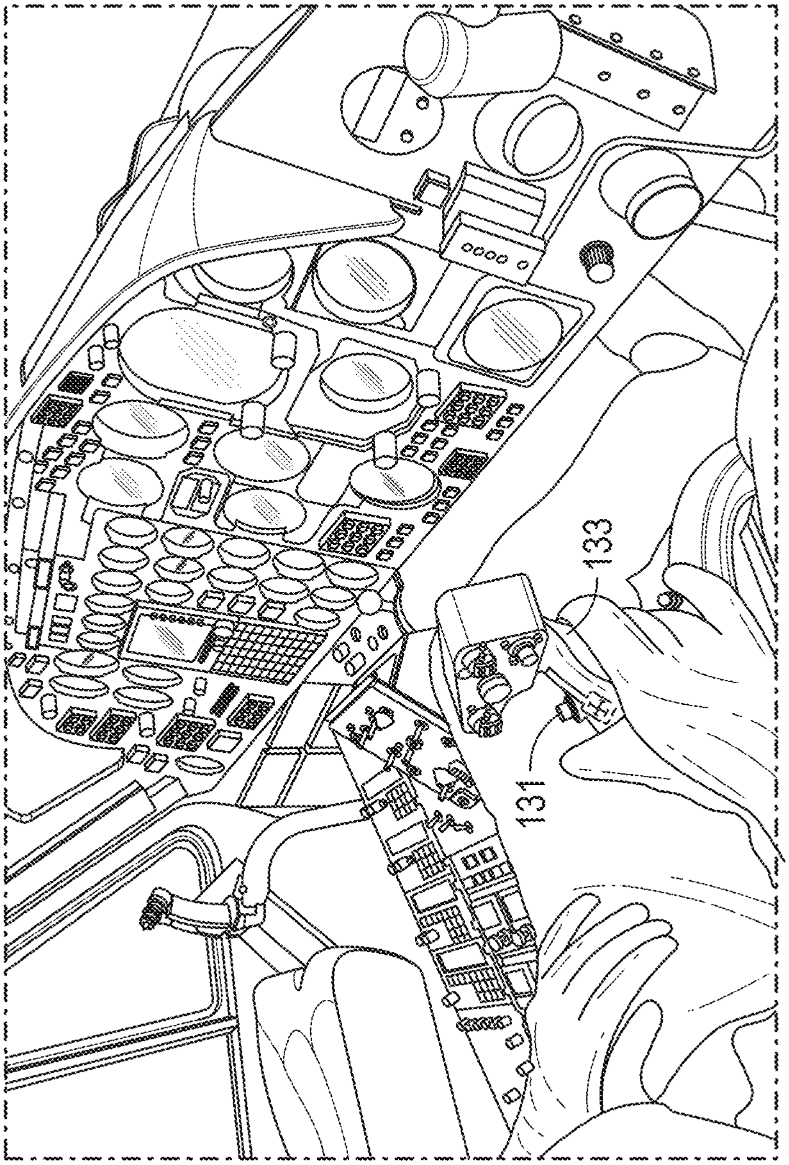
FIG. 7 is an illustration of a portion of a cockpit of a firefighting helicopter.

In any embodiments, the receiver 124 can be configured to receive and process one or a plurality of clicks (also referred to as squelch breaks) produced by a transmitter within the helicopter 103. The transmitter can be the same as or similar to the transmitter used in aircraft radio control of aerodrome lighting (ARCAL) or pilot-activated lighting (PAL) or any other system that allows aircraft pilots to control the lighting of an airport or airfield's approach lights, runway edge lights, and/or taxiways via radio frequency transmissions. The transmitter can comprise a switch or button within the helicopter that is configured to be actuated by a pilot of the helicopter. The switch or button can be a pre-existing switch or button such that no retrofitting or special equipment needs to be added to the helicopter. In any embodiments, the transmitter can include a radio transmit button 131 on a collective lever 133 within the helicopter, such as is illustrated in FIG. 7.

In any embodiments, the receiver 124 can be configured to receive a communication over a preset or predetermined radio frequency from the transmitter and to provide an output communication to the controller 122 upon receipt of a predetermined radio communication. In any embodiments, the receiver 124 can be configured to provide the output communication to the controller 122 if the communication includes one or more predetermined characteristics transmitted over a predetermined radio frequency or range of predetermined frequencies during a predetermined period of time not exceeding a predetermined period of time. For example and without limitation, any embodiments of the receiver 124 can be configured to provide the output communication to the controller 122 upon receipt of a predetermined number of clicks from the transmitter during a predetermined period of time.

A timer 125 electronically coupled with the receiver 124 or integrated with the receiver 124 can be used to monitor or track the time from the receipt of the first click. Additionally, a counter 127 can be used to keep track of the number of clicks received within the predetermined amount of time.

For example and without limitation, some embodiments of the pilot controlled valve assembly 108 can be configured such that the receiver 124 will provide the output communication to the controller 122 upon receipt of from five clicks from the transmitter over a predetermined radio frequency during a predetermined period of time, or upon receipt of from one to six clicks, or from three to five clicks from the transmitter over a predetermined radio frequency during a predetermined period of time. In any embodiments, the output communication can include at least one of a voltage, a current, a pulse, and an electromagnetic wave. Further, the pilot controlled valve assembly 108 can optionally include a relay assembly and/or one or more control switches 129 electronically coupled with one or more of the components of the pilot controlled valve assembly 108. Any embodiments of the pilot controlled valve assembly 108 can also have a visual display 142 that can be used to communicate information regarding the operating status of the receiver 124 and/or other components of the pilot controlled valve assembly 108.

In any embodiments, the predetermined number of clicks to cause the receiver 124 to provide the output communication to the controller 122 to cause controller 122 to (e.g., substantially automatically) open the supply valve 120 and to (e.g., substantially automatically) close the drain valve 121 (i.e., to change the system 100 from the standby state to the active state) can be three clicks, or optionally from one to eight clicks, or from three to five clicks within the predetermined period or duration of time. Additionally, as mentioned, the pilot controlled valve assembly 108 can be configured such that, when the receiver 124 receives a second predetermined number of clicks during the predetermined period or duration of time, the receiver 124 can provide a second output communication to controller 122 to cause controller 122 to (e.g., substantially automatically) close the supply valve 120 and open the drain valve 121 (i.e., to change the system from the active state to the standby state). The pilot can, for example, transmit the second predetermined number of clicks during the last refill of the aircraft. In any embodiments, the second predetermined number of clicks can be five clicks, or from four to eight clicks, or from five to seven clicks. The second predetermined number of clicks can be any number of clicks greater than the predetermined number of clicks designated to cause the receiver 124 to provide the output communication to controller 122 to cause controller 122 to open the supply valve 120, or optionally two greater than the predetermined number of clicks designated to cause the receiver 124 to provide the output communication to controller 122 to cause controller 122 to open the supply valve 120.

The pilot may wish to close the supply valve 120 for any number of reasons. For example, the pilot may wish to close the supply valve 120 if the pilot realizes that the tank 104 has or will have more water than is needed, if the pilot begins siphoning water before the water level within the tank 104 has reached the fill capacity or shut-off valve capacity of the tank and does not want the tank 104 to fill any higher, or otherwise.

To avoid cross-talk or inadvertent input signals or communications, some embodiments of the pilot controlled valve assembly 108 can be configured such that the receiver 124 will only recognize clicks or other signals or communications that are at a predetermined radio frequency, or within a predetermined radio frequency range. The predetermined radio frequency can optionally be 122.800 MHz, or from 118.000 MHz to 132.000 MHz, or from 122.700 MHz to 123.075 MHz, or from 122 MHz to 125 MHz, or any frequency within these ranges, or from and to any frequencies in these ranges. In some embodiments, the predetermined radio frequency can be the same as the universal communications frequency. Accordingly, in any embodiments, the receiver 124 can be tunable to 122.800 MHz, or to any frequency from 118.000 MHz to 132.000 MHz, or to any frequency from 122.700 MHz to 123.075 MHz, or to any frequency from 122 MHz to 125 MHz, or to any frequency within these ranges, or from and to any frequencies in these ranges. In any embodiments, the receiver 124 can be tunable by adjusting one or more switch settings that can be positioned on or supported by the receiver 124.

In any embodiments, the predetermined period of time during which the number of clicks can be counted can be three seconds, or four seconds, or five seconds, or from one to ten seconds, or from four to seven seconds, or from three to five seconds. The predetermined period of time can be configured to begin upon receipt of a first click received by the receiver 124.

In any embodiments, the receiver 124 can be configured to receive a communication produced by a transmitter within the firefighting helicopter 102 and to provide an output communication to the controller 122 when the firefighting helicopter 102 is within a predetermined distance from the receiver 124 to eliminate or reduce inadvertent signals from being received by the receiver 124. In any embodiments, the predetermined distance can be one mile or approximately one mile, or one-half mile or approximately one-half mile, or from approximately one-quarter mile or less to approximately three miles or more, or from approximately one-half mile to approximately one mile, or no more than one mile or approximately one mile, or any value or range of values within these ranges.

In any embodiments, the power supply 130 can be a 24-volt direct current power supply, or a 12-volt direct current power supply, or a direct current power supply from 12 volts or less to 24 volts or more. Additionally, in any embodiments, the power supply 130 can be a 110 volt power supply. The power supply 130 can optionally include at least one of a photovoltaic panel, a battery, a turbine, a generator, a fuel cell, and/or any other type of power or energy source. Further, in any embodiments, the pilot controlled valve assembly 108 can be configured to remain powered on and in a ready state at all times and to receive a communication produced by a transmitter within a firefighting helicopter 102 at any time of the day.

In any embodiments, the pilot controlled valve assembly 108 can include an antenna 140 in electronic communication with the receiver 124. The antenna 140 can be coupled with the receiver 124 using a conductive cable. In any embodiments, the pilot controlled valve assembly 108 can include an antenna 140 having a detection range of one-half mile or approximately one-half mile, or one mile or approximately one mile, or from approximately one-quarter mile or less to approximately four miles or more, or from approximately one-half mile to approximately two miles, or from approximately one-half mile to approximately 1 mile, or any value or range of values within these ranges. The antenna can have a lightning arrestor placed in line with the cabling connected to the antenna.

In any embodiments, the pilot controlled valve assembly 108 can also be configured to turn on and/or off optional indicator lighting on or around the tank to assist the pilot with seeing the tank for snorkel placement in dark conditions, and/or to find tank in dark conditions. Any of the systems disclosed herein can be configured such that a different number of clicks within a predetermined amount of time as compared to the clicks used for turning the valve on and/or off can be used to turn the lights on and/or off.

Figure 8:
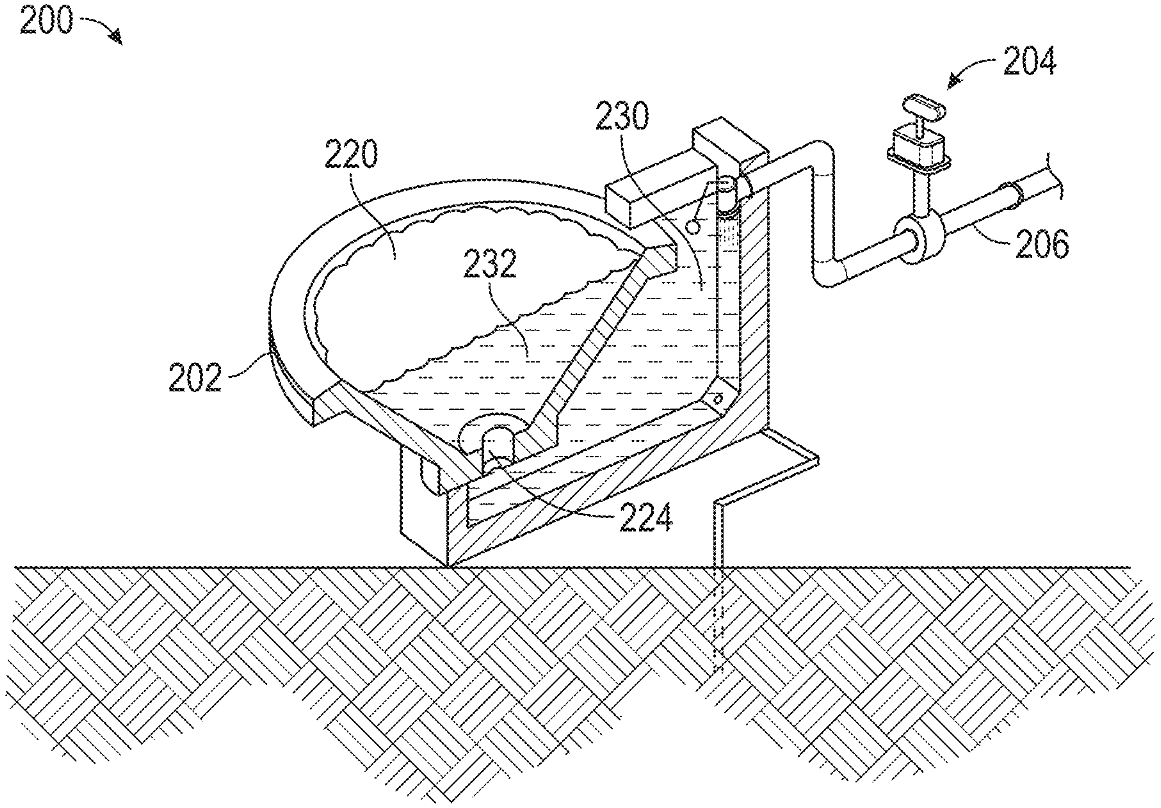
FIG. 8 is another illustration of a system for filling a firefighting helicopter with water without ground personnel.
Figure 9:
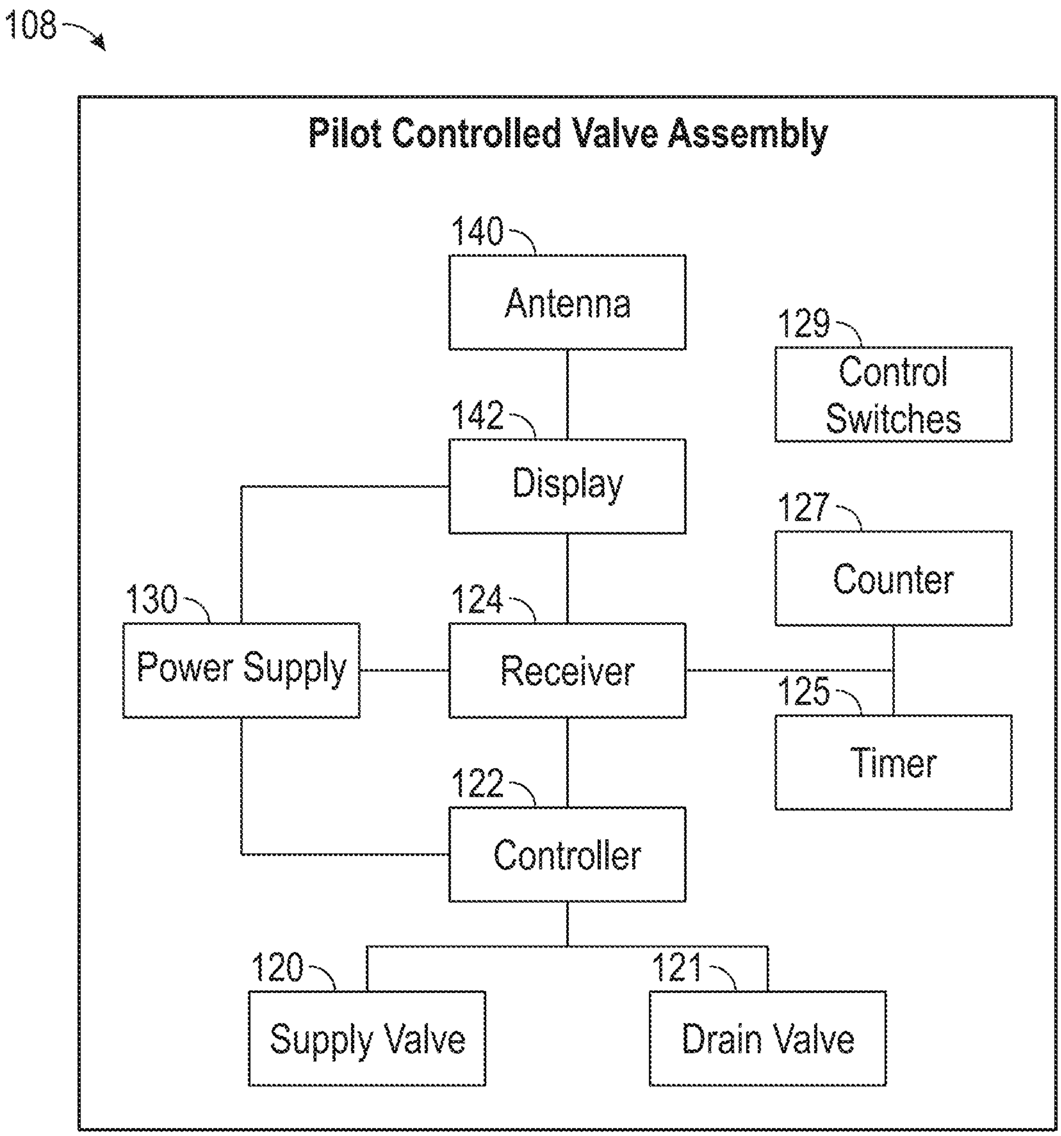
FIG. 9 is a schematic representation of an embodiment of a pilot controlled valve assembly.

Any embodiments of the tank 104 can have one or more pipes 160 configured to communicate any excess or overflow water from the overflow pipe 113 into the ground. The tank of any embodiments disclosed herein can have any desired shape, size, or capacity, including a cylindrical tank have an approximately twelve foot four inch diameter, a height of approximately five feet, and/or a capacity of approximately 500 gallons or less—5,000 or more gallons, for example approximately 2,400 gallons, or any desired shape, size, or capacity. For example and without limitation, any embodiments of the system disclosed herein can have a tank having an approximately conical shape, such as the tank 202 of the system 200 shown in FIG. 8, wherein one or more walls of the tank 202 taper to a narrower size near a bottom of the tank 202. The system 200 can have a pilot controlled valve assembly 204 coupled with an inlet pipe 206 in communication with the tank 292. The system 200 and/or the pilot controlled valve assembly 204 can have any of the components, features, or other details of any of the other systems and valve assemblies disclosed herein, in the alternative to or in addition to the details disclosed herein.

The tank 202 can have an opening 220 at an upper portion of the tank 202 that has a greater size or diameter than a second opening 224 positioned at a bottom of the tank. The second opening 224 can be much smaller than the opening 220 and can be configured to communicate water from a first space or cavity 230 to a second space or volume of the tank 202. In any embodiments disclosed herein, the tank can be filled with any substance, including without limitation water, a fire suppression liquid or solid, or other liquid or solid substance, or any combination of the foregoing.

Figure 10:
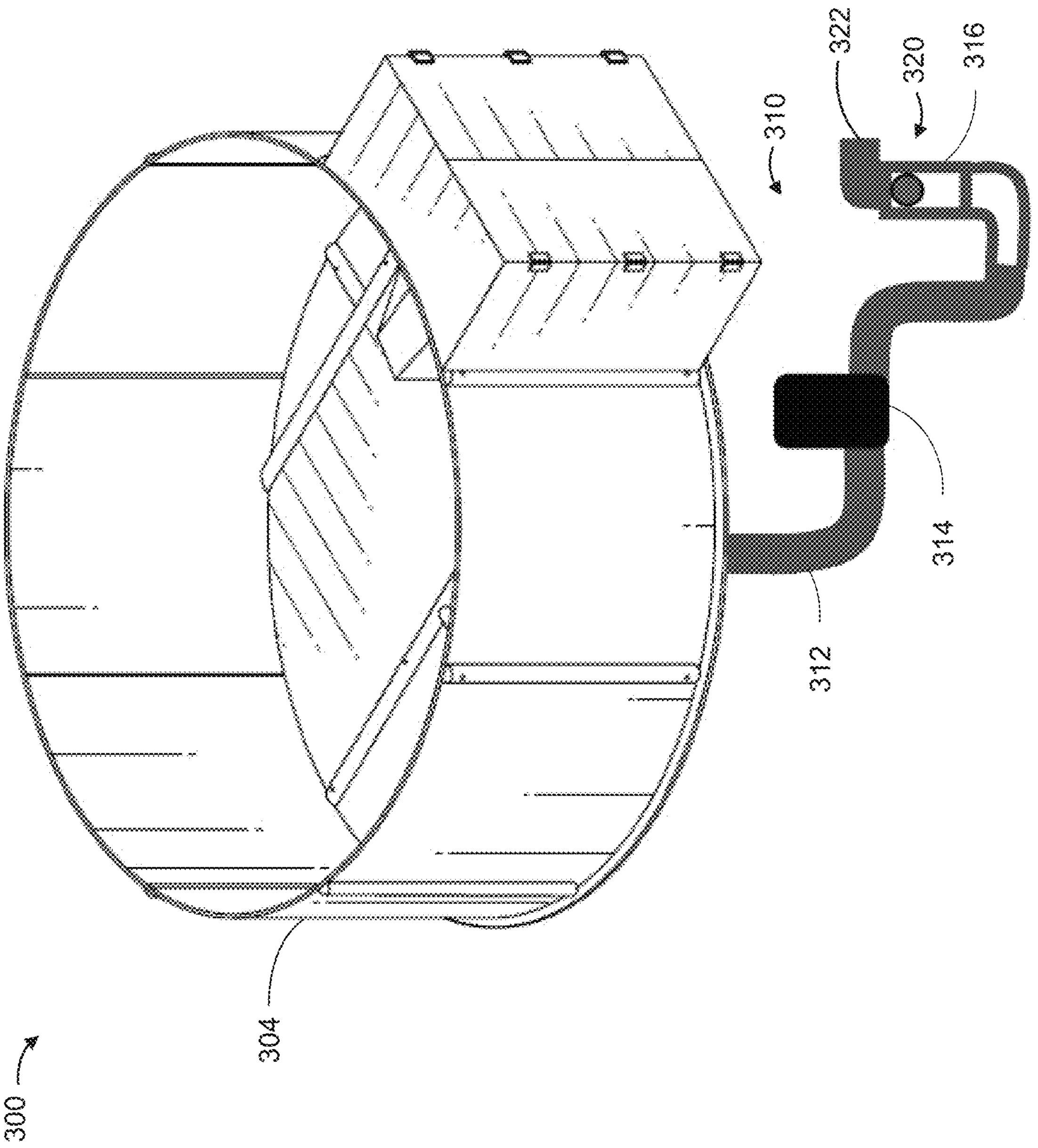
FIG. 10 is an illustration of another embodiment of a system for filling a firefighting aircraft with water without ground personnel, showing an illustration of an embodiment of a drain assembly in communication with a tank of the system for filling a firefighting aircraft.

FIG. 10 is an illustration of another embodiment of a system 300 for filling a firefighting aircraft with water without ground personnel, showing an illustration of an embodiment of a drain assembly 310 in communication with a tank 304 of the system 300 for filling a firefighting aircraft. In any embodiments disclosed herein, the system 300 can have any of the components, features, or other details of any other embodiments of systems for filing a firefighting aircraft disclosed herein, including without limitation any of the embodiments of the system 100 and/or system 200 shown in FIGS. 1-9, in any combination with any of the components, features, or details described below. For example and without limitation, any embodiments of the system 300 disclosed herein can include any of the embodiments of the tanks, communications devices, valves, or other components disclosed herein, in any combination with any of the other features of the system 300 disclosed herein. Similarly, any other embodiments of systems for refilling a firefighting aircraft disclosed herein can have any of the components, features, or other details of any embodiments of the system 300 disclosed herein in any combination with any of the components, features, or details of the other embodiments of the systems for refilling a firefighting aircraft.

Any embodiments of the drain assembly 310 can be configured to drain unwanted liquid from the tank 304 and to maintain the tank 304 in a dry condition, or at least a nearly dry condition, when the tank 304 is not in use. As will be described, some embodiments of the drain assembly 310 can be configured to permit water to drain from the tank 304 when a volume of water in the tank 304 is low and/or when a flow of water into the tank is low.

With reference to FIG. 10, some embodiments of the drain assembly 310 can have a pipe 312 or a plurality of pipes 312 in fluid communication with the tank 304. In some embodiments, the pipe 312 can be positioned at a low point at a bottom of the tank 304 (e.g., without limitation, the lower point at the bottom of the tank) to facilitate a more complete drainage from the tank 304. In some embodiments, the drain assembly 310 can have multiple pipes having multiple inlets positioned at or near a bottom of the tank 304. The pipe 312 can have one more elbows or curves therein, and can be in fluid communication with a filter 314 that can be used to remove contamination such as, without limitation, dirt, pine needles, leaves, and other debris that can be in the fluid flowing through pipe 312. The filter 314 can be configured to prevent the drain assembly 310, or a valve thereof, from becoming clogged. The drain assembly 310 can have an upright pipe portion 316 (that can be, but is not required to be, in a vertical or near vertical orientation during operation of the drain assembly 310) and a valve assembly 320 that can control a flow of the liquid through the drain assembly 310, as will be described in greater detail below. The drain assembly 310 can have a terminal end point 322 that can permit any fluid passing through the valve assembly 320 to exit the drain assembly 310 into the air, the ground, into a municipal water collection system, or otherwise.

Figure 11B:
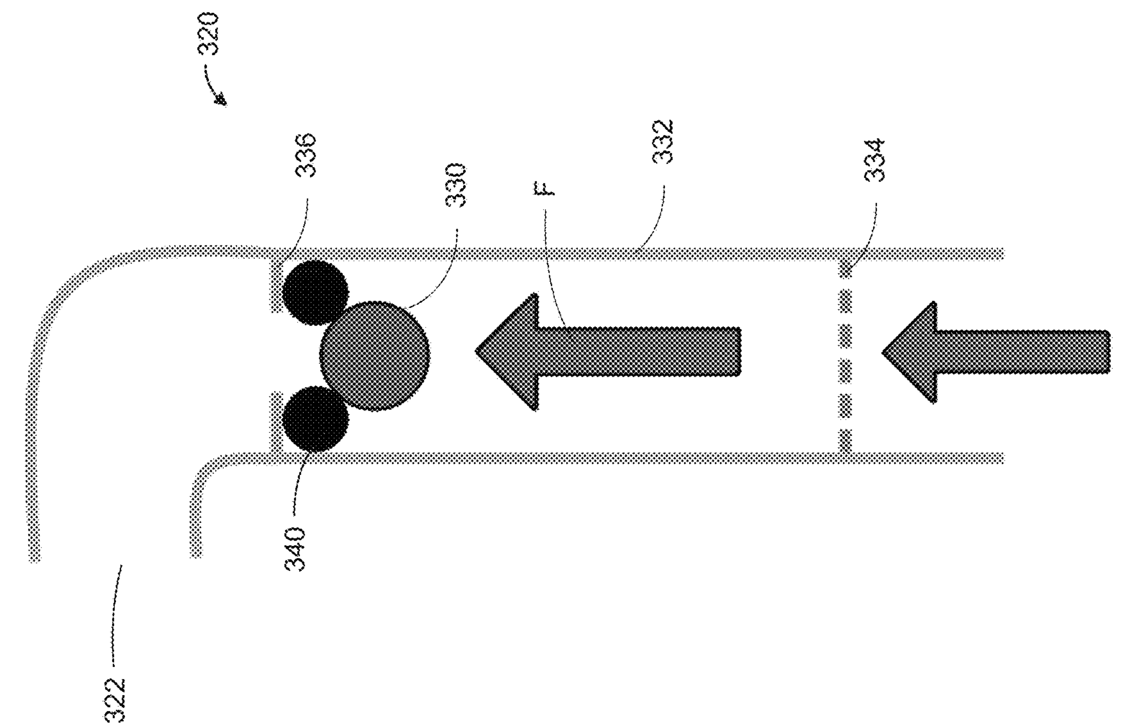
FIG. 11B is an illustration of the embodiment of the valve assembly of the embodiment of the drain assembly shown in FIG. 10, showing the valve portion in a second, closed state.
Figure 11A:
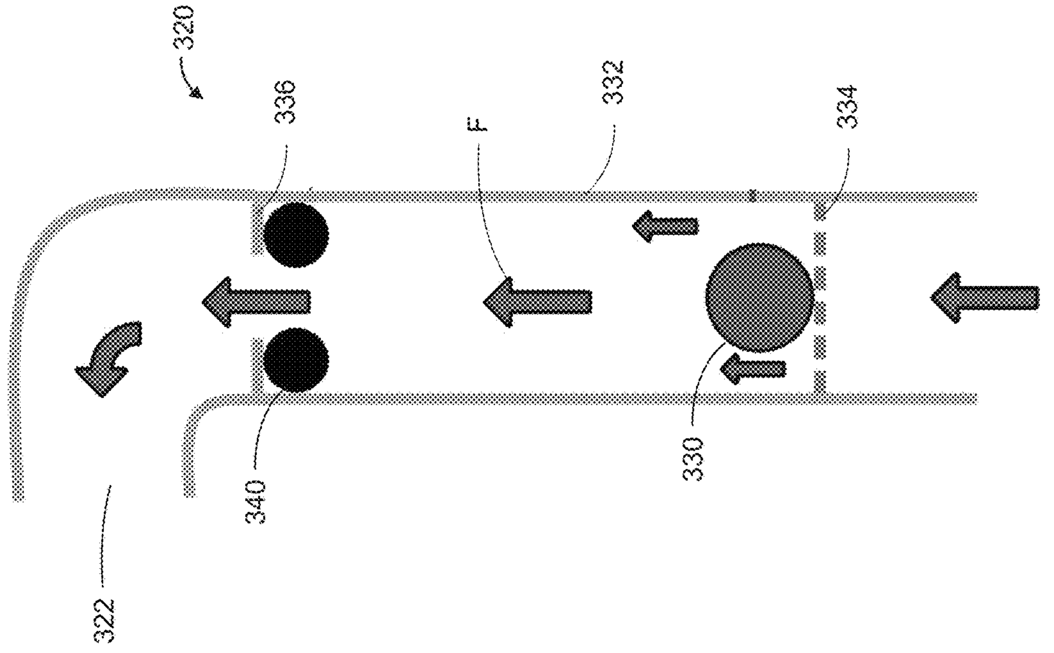
FIG. 11A is an illustration of an embodiment of a valve assembly of the embodiment of the drain assembly shown in FIG. 10, showing the valve portion in a first, open state.

FIG. 11A is an illustration of an embodiment of the valve assembly 320 of the embodiment of the drain assembly 310 shown in FIG. 10, showing the valve assembly 320 in a first, open state. FIG. 11B is an illustration of the embodiment of the valve assembly 320 of the embodiment of the drain assembly 310 shown in FIG. 10, showing the valve assembly 320 in a second, closed state. With reference to FIGS. 11A, 11B, any embodiments of the drain assembly 310 can have a vertical pipe portion 316. In some embodiments, the valve assembly 320 or components thereof can be positioned within or supported by upright pipe portion 316. In some embodiments, the valve assembly 320 can be supported within a housing or enclosure (also referred to as a casing) 332 instead of being supported within a pipe or instead of being positioned within or supported by upright pipe portion 316. In such embodiments, the housing or enclosure can be in communication with the pipe 312 and/or the upright pipe 316.

In some embodiments, the valve assembly 320 can have a plug or stopper 330 that can be configured to move within at least a portion of upright pipe portion 316. In some embodiments, the stopper 330 can have a spherical shape (as shown), a cylindrical shape, or any other desired shape, and can have any desired size. In some embodiments, a size of the stopper 330 can be less than an inside dimension of the walls of the casing 332 or outer walls of the valve assembly 320. In some embodiments the stopper 330 can be made from any of a range of different materials and material types. In some embodiments, the stopper 330 can be heavier than water or other liquid that is within the drain assembly 310 and/or the tank 304. In some embodiments, the pipe 312, upright pipe 316, and/or other pipe components of the drain assembly 310 can be made from any suitable material, including without limitation PVC, ABS, steel, or otherwise and can have any desired size (such as, without limitation, 3 inch diameter, 2 inch diameter, or otherwise). In some embodiments, the stopper 330 can have a 1 inch or an approximately 1 inch diameter, and the casing 332 can have a 1.25 inch or an approximately 1.25 inch inner or outer diameter, or a 1.5 inch or an approximately 1.5 inch inner or outer diameter.

Some embodiments of the valve assembly 320 can have a lower or first support 334 and an upper or second support 336 configured to limit a range of movement of the stopper 330. The first support 334 can be configured to provide a lower limit of movement or support for the stopper 330 to prevent the stopper 330 from moving upstream of the second support 336 and the second support 336 can be configured to provide an upper limit of movement or upper support for the stopper 330 to prevent the stopper 330 from moving downstream of the second support 336. Both the first and second supports 334, 336 can have openings therein and/or be configured to permit at least water or other fluid to pass therethrough. Fluid F within the drain assembly 310 is represented by arrows. The arrows also represent a direction of flow of the fluid F and a flow velocity of the fluid F, with a larger arrow being used to represent a higher flow velocity than a smaller arrow. The flow velocity of the fluid F in the illustration shown in FIG. 11B is greater than the flow velocity of the fluid F in the illustration shown in FIG. 11A.

Any embodiments of the valve assembly 320 can have a seal 340 positioned at a second or upper end portion of the valve assembly 320. Some embodiments of the valve assembly 320 can have the first support 334 and have the seal 340 in place of or integrally formed with the second support 336. The seal 340 can be configured such that, when the stopper 330 is moved into contact with the seal 340, the stopper 330 and seal 340 inhibit (e.g., prevent) a flow of fluid through at least the second or downstream end of the valve assembly 320 and, consequently, the drain assembly 310, thereby effectively closing the valve, as shown in FIG. 11B. A pressure of the water within the tank 304 and/or the valve assembly 320 can hold the stopper 330 in contact with the seal 340 until the level of water within the tank is reduced below a threshold amount, such as during siphoning by a firefighting aircraft. When the flow of fluid F through the valve assembly 320 is too low to cause the stopper to move into contact with the seal 340, as shown in FIG. 11A, the valve assembly 320 will be in an open position or state and will permit a flow of water or fluid through the valve assembly 320 and the drain assembly 310. Therefore, the valve assembly 320 can be configured such that a low flow rate of water or other fluid can pass through the valve assembly 320 without causing the valve assembly 320 to move to a closed state and such that a high or threshold flow rate of water or other fluid will cause the valve assembly 320 to move to a closed state by moving the stopper 330 into contact with the seal 340. In some embodiments, the specific gravity, diameter or size, and/or shape of the stopper 330 can affect the threshold flow velocity that causes the stopper 330 to move into contact with the seal 340. For example and without limitation, decreasing the size of the stopper 330 and/or increasing the specific gravity of the stopper 330 can result in the valve assembly 320 requiring a higher flow rate of fluid to cause the valve assembly 320 to close. In some embodiments, the inside size and/or diameter inside the housing 332 can also affect the threshold flow volume that causes the stopper 330 to move into contact with the seal 340. For example, in some embodiments, a smaller inside size or diameter of the casing 332 can result in a higher flow rate within the valve assembly 320 as compared to a larger size or diameter of the casing 332. In some embodiments, the specific gravity of the stopper 330 can be just greater than the specific gravity of the water under normal operating conditions.

When fluid enters the tank 304 and/or the drain assembly 310, such as during a rain event, a snow melt event, or otherwise, the flow of fluid through the drain assembly 310 and, hence, the valve assembly 320 can be low. In some embodiments, the valve assembly 320 can be configured such that the valve assembly 320 will remain in an open position or state when the flow velocity of fluid through the valve assembly 320 is low, such as during a rain event, a snow melt event, or other low volume rate event, and the valve assembly 320 can be configured such that the valve assembly 320 will move or change to a closed state or position when the flow rate or velocity increases beyond a threshold amount, such as when the system 300 is being filled for use in fighting a fire. The stopper 330 can move back to the first position when the flow rate or velocity drops below the threshold amount. In some embodiments, the valve assembly 320 can be configured to remain in an open state with 2 inches or approximately 2 inches of water in the tank 304 at the location of the drain assembly 310, but to close when the amount of water exceeds this amount, or to remain in an open state with approximately 2 inches of water in the tank 304 at the location of the drain assembly 310, but to close when the amount of water exceeds this amount, or to remain in an open state with 4 inches or approximately 4 inches of water in the tank 304 at the location of the drain assembly 310, but to close when the amount of water exceeds this amount, or to remain in an open state with 9 inches or approximately 9 inches of water in the tank 304 at the location of the drain assembly 310, but to close when the amount of water exceeds this amount, or to remain in an open state with 2 inches or approximately 2 inches of water in the tank 304 at the location of the drain assembly 310, but to close when the amount of water exceeds this amount. The valve assembly 320 can be configured or customized for any desired level of water in the tank or flow rate of water through the valve assembly 320.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure.

The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as “can,” “could,” “might,” or “may,” unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase “at least one of X, Y, and Z,” unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms “approximately,” “about,” “generally,” and “substantially” as used herein represent a value, amount, or characteristic close to the stated value, amount, or characteristic that still performs a desired function or achieves a desired result. For example, the terms “approximately”, “about”, “generally,” and “substantially” may refer to an amount that is within less than 10% of, within less than 5% of, within less than 1% of, within less than 0.1% of, and within less than 0.01% of the stated amount. As another example, in certain embodiments, the terms “generally parallel” and “substantially parallel” refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A system for filling a firefighting vehicle with a firefighting substance, comprising:
- a refill tank having an inlet and an interior space in fluid communication with the inlet;
- a remote controlled valve assembly in fluid communication with the inlet and configured to selectively control a flow of firefighting substance into the tank, the remote controlled valve assembly comprising;
  - a supply valve configured to move between at least a closed state and an open state;
  - a controller electronically coupled with the supply valve;
  - a receiver electronically coupled with the controller; and
  - a power supply configured to provide a supply of power to at least one of the supply valve, the controller, and the receiver;
  - wherein:
    - the receiver is configured to receive a communication produced by an electronic communication device within the firefighting vehicle and to provide an output communication to the controller; and the controller is configured to cause the supply valve to at least move from the closed state to the open state substantially automatically upon receipt of the output communication from the receiver, thereby permitting a flow of firefighting substance from a firefighting substance source into the interior space of the refill tank without the need for a ground support personnel.

2. The system of claim 1, wherein the controller is configured to cause a drain valve to move from an open state to a closed state substantially automatically upon receipt of the output communication from the receiver, thereby terminating any flow of firefighting substance from the interior space of the tank through a drain pipe without the need for a ground support personnel.

3. The system of claim 1, wherein the refill tank is configured such that a firefighting vehicle positioned above the refill tank can pump the firefighting substance from the refill tank through a refill hose coupled with the firefighting vehicle when an end portion of the refill hose has been positioned in the interior of space of the refill tank.

4. The system of claim 1, wherein the firefighting substance is water and the firefighting substance source comprises a water pipe coupled with a municipal water source.

5. The system of claim 1, wherein the receiver is configured to provide the output communication to the controller upon receipt of from one to six clicks from the electronic communication device during a five second period of time.

6. The system of claim 1, wherein the receiver is configured to provide the output communication to the controller upon receipt of from one to six clicks from the electronic communication device over a predetermined radio frequency during a five second period of time.

7. The system of claim 1, wherein the receiver is configured to receive a communication over a preset radio frequency from the electronic communication device and to provide the output communication to the controller upon receipt of a predetermined radio communication.

8. The system of claim 1, wherein the receiver is configured to provide the output communication to the controller upon receipt of at least a predetermined number of clicks from the electronic communication device over a predetermined radio frequency during a predetermined period of time that is less than seven seconds when the firefighting vehicle is within a predetermined distance from the receiver that is less than two miles.

9. The system of claim 8, wherein the predetermined number of clicks is from one to eight clicks.

10. The system of claim 8, wherein the predetermined radio frequency is the same as the universal communications frequency.

11. The system of claim 8, wherein the predetermined period begins upon receipt of a first click received by the receiver.

12. The system of claim 1, wherein the pilot controlled valve assembly is configured to remain powered on and in a ready state at all times and to receive the output communication produced by the electronic communication device within the firefighting vehicle at any time of the day.

13. The system of claim 1, wherein the firefighting vehicle is a helicopter and the electronic communication device comprises a button within the helicopter that is configured to be actuated by a pilot of the helicopter.

14. The system of claim 1, wherein the firefighting vehicle is a helicopter and the electronic communication device comprises a radio transmission switch or button within the helicopter that is configured to be actuated by a pilot of the helicopter.

15. The system of claim 1, comprising a fluid level sensor in fluid communication with the interior space of the water refill tank, the fluid level sensor being configured to cause the supply valve to close when a level of fluid within the interior space of the refill tank reaches a predetermined level.

16. The system of claim 1, comprising a drain assembly configured to automatically close when a flow rate through the drain assembly reaches or exceeds a threshold level and to remain open when a flow rate through the drain assembly is below the threshold level.

17. The system of claim 16, wherein the drain assembly comprises a drain valve assembly comprising a stopper that is configured to move from a first open position to a second closed position when a flow rate through the drain assembly reaches the threshold level.

18. The system of claim 17, wherein the drain valve assembly comprises a stopper configured to move from a first position spaced apart from a seal to a second position in contact with the seal when a flow rate through the drain assembly reaches the threshold level.

19. The system of claim 1, wherein the electronic communication device is a transmitter.

20. The system of claim 1, wherein the firefighting vehicle is a drone.

21. The system of claim 1, wherein the output communication comprises at least one of a voltage, a current, a pulse, and an electromagnetic wave.

22. The system of claim 1, wherein the pilot controlled valve assembly comprises an antennae having a detection range of from approximately one-half mile to approximately one mile.

23. The system of claim 1, further comprising a water level sensor positioned in communication with the interior space of the water refill tank and configured to cause the supply valve to close when a level of water within the interior space of the water refill tank reaches a predetermined level.

24. The system of claim 1, wherein the system further comprises a firefighting helicopter comprising the electronic communication device which is a transmitter located within the firefighting helicopter and a water refill hose or bucket.

25. A tank for filling a firefighting vehicle with a firefighting substance, comprising:

an inlet and an interior space in fluid communication with the inlet;

a remote controlled valve assembly in fluid communication with the inlet and configured to selectively control a flow of firefighting substance into the tank, the remote controlled valve assembly comprising;

a supply valve configured to move between at least a closed state and an open state;

a controller electronically coupled with the supply valve; and a receiver electronically coupled with the controller;

a drain assembly configured to allow the firefighting substance to drain from the interior space of the tank; wherein:

the receiver is configured to receive a communication produced by a transmitter and to provide an output communication to the controller;

the transmitter is in communication with the receiver but is separate from the tank and the remote controlled valve assembly;

the controller is configured to cause the supply valve to at least move from the closed state to the open state substantially automatically upon receipt of the output communication from the receiver, thereby permitting a flow of firefighting substance from a firefighting substance source into the interior space of the refill tank; and the drain assembly is configured to be in an open state to thereby allow any firefighting substance within the tank to automatically drain from the tank if a volume of any firefighting substance within the tank is below a threshold level.

26. The tank of claim 25, wherein the receiver is configured to provide the output communication to the controller upon receipt of at least a predetermined number of clicks from the transmitter over a predetermined radio frequency during a predetermined period of time that is less than seven seconds when the firefighting vehicle is within two miles of the receiver.

27. The tank of claim 25, wherein the firefighting vehicle is a helicopter and the transmitter comprises a button within the helicopter that is configured to be actuated by a pilot of the helicopter.

* * * * *